United States Patent
Lin et al.

(10) Patent No.: US 11,997,714 B2
(45) Date of Patent: May 28, 2024

(54) TRANSMISSION METHOD WITH LBT ACCESS TO A CHANNEL, CORRESPONDING DEVICE AND PROGRAM

(71) Applicant: Orange, Issy-les-Moulineaux (FR)

(72) Inventors: Hao Lin, Chatillon (FR); Getachew Redieteab, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 395 days.

(21) Appl. No.: 17/609,219

(22) PCT Filed: Apr. 21, 2020

(86) PCT No.: PCT/EP2020/061056
§ 371 (c)(1),
(2) Date: Nov. 5, 2021

(87) PCT Pub. No.: WO2020/224947
PCT Pub. Date: Nov. 12, 2020

(65) Prior Publication Data
US 2022/0217775 A1    Jul. 7, 2022

(30) Foreign Application Priority Data
May 6, 2019 (FR) ...................................... 1904717

(51) Int. Cl.
*H04W 74/0816* (2024.01)
*H04W 16/14* (2009.01)
(Continued)

(52) U.S. Cl.
CPC ....... *H04W 74/0816* (2013.01); *H04W 16/14* (2013.01); *H04W 72/0446* (2013.01); *H04W 72/0453* (2013.01); *H04W 74/0866* (2013.01)

(58) Field of Classification Search
CPC .. H04W 72/0453; H04W 72/02; H04W 84/12
(Continued)

(56) References Cited

U.S. PATENT DOCUMENTS 10,980,062 B1 *  4/2021  Babaei ................. H04L 1/1841
2019/0132876 A1 *  5/2019  Shikari ............. H04W 72/0453
(Continued)

OTHER PUBLICATIONS

ZTE et al., "Framework on potential solutions and techniques for NR-U", vol. RAN WG1, No. Athens, Greece; Feb. 26, 2018-Mar. 2, 2018, Feb. 17, 2018 (Feb. 27, 2018), 3GPP Draft; R1-1801466-7.6.4 Framework On Potential Solutions and Techniques for NR-U, 3rd Generation Partnership Project (3GPP), Mobile Competence Centre ; 650, Route Des Lucioles ; F-06921 Sophia—Retrieved from the Internet: URL:http://www.3gpp.org/ftp/tsg%5Fran/WG1%5FRL1/TSGR1%5F92/Docs/, XP051397565.

(Continued)

*Primary Examiner* — Anthony Mejia
(74) *Attorney, Agent, or Firm* — David D. Brush; Westman, Champlin & Koehler, P.A.

(57) ABSTRACT

A method for transmitting data by a device having a cell, called a second cell, conforming to a first protocol of a cellular access network and capable of transmitting in a frequency band shared with a network conforming to a second protocol and capable of implementing a listening-before-transmission (LBT) access mechanism. The method includes: using the LBT access mechanism by a first cell, and transmitting by the first cell an identification of a first sharing group, first channel sharing information and a transmission duration; using the LBT access mechanism with adaptation by the second cell to determine an interfering power separately from a received power of a transmission from the first cell; and enabling channel sharing with the first cell if the second cell belongs to the same first sharing group, the first channel sharing information authorizes the sharing and the interfering power does not exceed a given threshold.

12 Claims, 4 Drawing Sheets

Figure 1:
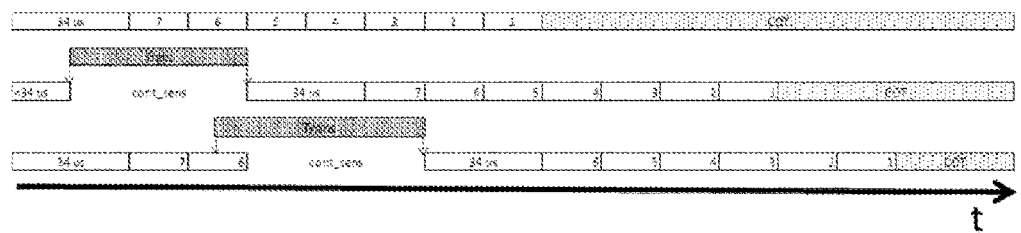

(51) Int. Cl.
*H04W 72/0446* (2023.01)
*H04W 72/0453* (2023.01)
*H04W 74/08* (2009.01)

(58) Field of Classification Search
USPC .......................................................... 370/329
See application file for complete search history.

(56) References Cited

U.S. PATENT DOCUMENTS

2021/0235492 A1* 7/2021 Iyer ....................... H04W 72/23
2022/0217775 A1* 7/2022 Lin ................... H04W 74/0808

OTHER PUBLICATIONS

Sharp, "Channel access procedures for NR unlicensed operation", vol. RAN WG1, No. Spokane, USA; Nov. 12, 2018-Nov. 16, 2018, Nov. 11, 2018 (Nov. 11, 2018), 3GPP Draft; R1-1813206, 3rd Generation Partnership Project (3GPP), Mobile Competence Centre ; 650, Route Des Lucioles ; F-06921 Sophia-Antipolis Cedex ; France, Retrieved from the Internet: URL:http://www.3gpp.org/ftp/Meetings%5F3GPP%5FSYNC/RAN1/Docs/R1%2D1813206%2Ezip, XP051555209.

English translation of the Written Opinion of the International Searching Authority dated Jun. 8, 2020 for corresponding International Application No. PCT/EP2020/061056, filed Apr. 21, 2020.

International Search Report dated Jun. 8, 2020 for corresponding International Application No. PCT/EP2020/061056, Apr. 21, 2020.

Written Opinion of the International Searching Authority dated Jun. 8, 2020 for corresponding International Application No. PCT/EP2020/061056, Apr. 21, 2020.

IEEE Standard for Information technology, Telecommunications and information exchange between systems Local and metropolitan area networks, Specific requirements, Part 11: Wireless LAN Medium Access Control (MAC) and Physical Layer (PHY) Specifications, IEEE Std 802.11™ 2016, Revision of IEEE Std 802.11-2012.

Technical Specification, ETSI TS 136 213 V13.0.0 (May 2016), LTE; Evolved Universal Terrestrial Radio Access (E-UTRA); Physical layer procedures (3GPP TS 36.213 version 13.0.0 Release 13).

\* cited by examiner

Fig. 9

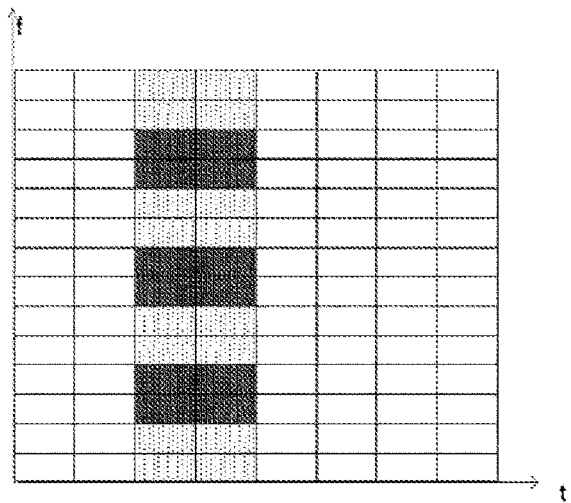

Fig. 10

|  | BS_id/cell_id | | |
|---|---|---|---|
| Identity of an operator | Sharing cell | Beneficiary cells | |
| Oper_id | BS_1/cell_1 | BS_1/cell_2 | BS_1/cell_3 |
| | BS_1/cell_2 | BS_2/cell_5 | BS_2/cell_6 |
| | BS_2/cell_4 | BS_1/cell_2 | BS_2/cell_5 |

Fig. 11

| Sharing information | Meaning |
|---|---|
| 00 | prohibited |
| 01 | $2^{nd}$ beneficiary only |
| 10 | $1^{st}$ beneficiary only |
| 11 | both beneficiaries |

Fig. 12

|  | BS_id/cell_id | | |
|---|---|---|---|
| Identity of an operator | Sharing cell | Beneficiary cells | |
| Oper_id | BS_1/cell_1 | BS_1/cell_2 | BS_1/cell_3 |

Fig. 13

|  | BS_id/cell_id | | |
|---|---|---|---|
| Identity of an operator | Sharing cell | Beneficiary cells | |
| Oper_id | BS_1/cell_2 | BS_2/cell_5 | BS_2/cell_6 |

TRANSMISSION METHOD WITH LBT ACCESS TO A CHANNEL, CORRESPONDING DEVICE AND PROGRAM

CROSS-REFERENCE TO RELATED APPLICATIONS

This Application is a Section 371 National Stage Application of International Application No. PCT/EP2020/061056, filed Apr. 21, 2020, the content of which is incorporated herein by reference in its entirety, and published as WO 2020/224947 on Nov. 12, 2020, not in English.

FIELD OF THE INVENTION

The present invention relates to the field of telecommunications. Within this field, the invention relates more particularly to transmission and reception methods for allowing coexistence, in one and the same unlicensed frequency band, of multiple transmissions that may be asynchronous. It is applicable in particular to portable telecommunications devices.

PRIOR ART

The communication transmission medium is commonly called a transmission channel or propagation channel, originally with reference to an airborne channel and, by extension, with reference to any channel. Wireless systems have what is called an RF (radiofrequency) radiofrequency transmission interface when they involve a telecommunications system with airborne transmission of a signal belonging to a radio band (for example GSM, UMTS, IEEE 802.11x, IEEE 802.16e). Among these systems, a distinction is drawn between cellular access systems that are also said to be mobile, specified more particularly by the 3GPP (Third Generation Partnership Program), and non-mobile systems that essentially comprise those based on a Wi-Fi standard, specified more particularly by the IEEE.

As part of the work carried out within the 3GPP and that led to version 13 of the LTE standard, the LAA (License Assisted Access) access mechanism was introduced and specified in the unlicensed 5 GHz radio band shared with the one used by Wi-Fi equipments. This mechanism uses the LBT (Listen Before Talk) mechanism, and in particular what is known as an LAA category 4 mode (cat4 scheme) is based on the Wi-Fi EDCA (Enhanced Distributed Channel Access) procedure, which makes it possible to improve coexistence with other communications and more particularly with those involved in the unlicensed LTE band.

The LBT cat4 mode is illustrated in FIG. 1. When a transmitter wishes to transmit a signal via the channel, it first has to listen to the channel for a fixed duration (34 μs). If the channel is not free, due to another transmission, the transmitter continues to listen cont_sens to the channel until the channel is free. Once the channel is free, the transmitter waits for the same fixed duration (34 μs), for which the channel has to remain free. At the end of this wait, the transmitter chooses a random number, called backoff, from among a scale of values, and starts counting down the backoff. Each decrement takes 9 μs, during which the channel has to remain free in order for the counter to be decremented by one unit. If the channel does not remain free and becomes busy during the decrementation period, then the transmitter suspends the countdown and resumes listening to the channel until it is free again. In this case, the countdown starts again only after a new fixed duration (34 μs) for which the channel has to remain free. At the end of the countdown, the transmitter may start transmitting. The duration of the transmission is called channel occupancy time (COT: Channel Occupancy Time).

When listening to the channel, the equipment uses a criterion based on detected energy to determine the state of the channel, busy (Busy) or free (Idle). The equipment thus estimates the received energy and compares it with a determined threshold. If the received energy exceeds the threshold, the channel is considered to be busy. If not, the channel is considered to be free.

As part of the work carried out within the 3GPP for the 5th Generation (5G) LTE-Advanced and NR (New Radio) specifications, modes with multiple connectivity are being contemplated. A user equipment (UE: User Equipment) may thus receive signals via multiple links served by one or more nodes, one node being a base station (BS: Base Station). A node may have multiple cells, for example when it is equipped with multiple directional antennas that each make it possible to establish a link with a user equipment.

Figure 2:
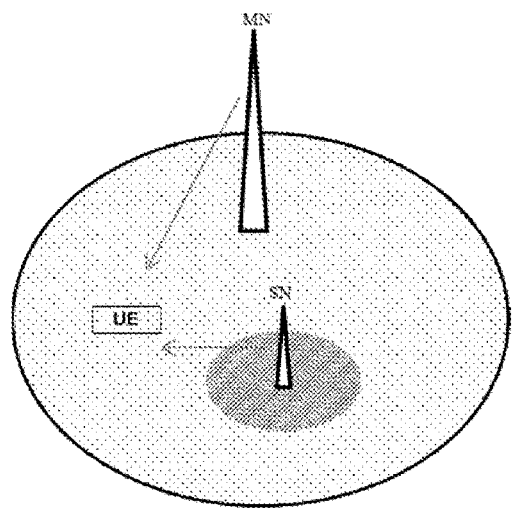

One multiple connectivity scenario contemplated by the 3GPP in the context of (5G) NR networks is that of dual connectivity (DC: Dual Connectivity) in which a terminal has the option of being connected simultaneously to what is known as a master node MN ("Master Node") and to what is known as a secondary node NS ("Secondary Node"), the master node and the secondary node not necessarily being collocated and being able to operate in separate frequency bands, as illustrated in FIG. 2. The two nodes simultaneously serve one and the same user equipment UE, i.e. the transmissions of the two nodes take place at the same time. Dual connectivity is a mechanism that advantageously makes it possible to aggregate the radio resources and in particular the data rates offered by the master and secondary nodes.

Figure 3:
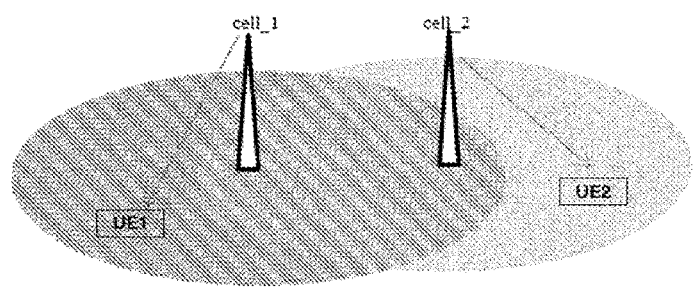

Telecommunications network operators are constantly looking for mechanisms to increase data rates. Consideration is given to the case of two cells cell_1, cell_2 that may serve various user equipments UE1, UE2 as illustrated in FIG. 3 according to the multiple connectivity scenario from the NR specifications. If the cells form part of a cellular access network, then the two cells cell_1, cell_2 may operate at the same time and may serve various user equipments UE1, UE2 at the same time. This makes it possible to obtain an efficient communication system both in terms of spectral use and in terms of latency.

However, such operation cannot be transposed directly to the unlicensed band due to the imposed LBT channel access mechanism. Indeed, the transmission of one cell prevents the other cell from transmitting simultaneously if the two cells are not far enough away from one another to ensure that the energy detected by the other cell does not exceed the determined threshold. Such a scenario is observed both in the context of a heterogeneous network and in the context of a homogeneous network.

The case of a heterogeneous network is described with reference to the example illustrated in FIG. 4, in which two cells cell_1, cell_2, belonging to one or more nodes of a cellular access network, coexist with a Wi-Fi node. If it is considered that each node has an identical probability of accessing the channel, then the two cells cell_1, cell_2 cannot access the channel simultaneously and have to be time-multiplexed. The transmission of one cell is therefore deferred due to the LBT mechanism, which requires waiting for the channel to be free, thereby introducing a time offset between two transmissions implementing different nodes.

Even in the absence of the Wi-Fi node, i.e. in the case of a homogeneous network, this time offset exists when the transmissions take place in the unlicensed band.

This time offset of course increases latency, and leads to a degradation in QoS (Quality of Service) compared to a homogeneous multicellular access network operating in a licensed band.

There is therefore a need for a technique that makes it possible to increase the spectral efficiency of the transmission channel when its access is LBT access, i.e. listen before talk, in particular in a context of a heterogeneous network with coexistence between a Wi-Fi technology and a mobile access network, for example an LTE mobile access network, in a common band, for example the unlicensed 5 GHz band.

SUMMARY OF THE INVENTION

The invention proposes a data transmission method implemented by an equipment having a cell conforming to a first protocol of a cellular access network, able to transmit in a frequency band shared with a network conforming to a second protocol and to implement a listen before transmit access mechanism. The method comprises:
  use of the listen before transmit access mechanism by another cell, called first cell, and transmission, by this first cell, of an identity of a first sharing group, of first channel sharing information and of a transmission duration,
  authorizing channel sharing with the first cell on the condition at least that the second cell belongs to the same first sharing group, that the first channel sharing information authorizes this sharing and that the interfering power does not exceed a given threshold,
  use of the adapted listen before transmit access mechanism by the cell, called second cell, such that this second cell determines an interfering power separately from a received power associated with a transmission of the first cell.

Any equipment/cell implementing a listen before transmit access mechanism that detects a transmission by a first cell, that is to say a received power that exceeds a certain threshold, considers the channel to be busy throughout the entire duration of this transmission and cannot access the channel for this duration.

On the other hand, if a cell belongs to the same sharing group as the first cell and the channel sharing information authorizes this sharing, if this cell implements the adapted listen before transmit access mechanism according to the invention, then it evaluates the portion of received power assigned only to interferers, called interfering power, from among the total received power; it therefore removes the received power assigned to the first cell from the total received power. If this evaluated interference level does not exceed the certain threshold, the cell considers the channel to be free under certain conditions, i.e. it may adopt the channel to transmit, but only for the transmission duration of the first cell.

The invention thus allows multi-node or multi-cell connectivity in the band with a listen before transmit access mechanism and makes it possible to increase spectral efficiency and to reduce latency for telecommunications services. This band with a listen before transmit access mechanism may be an unlicensed band of an NR-U (5G) access network.

Another subject of the invention is an equipment having a first cell, conforming to a first protocol of a cellular access network and able to transmit in a frequency band shared with a network conforming to a second protocol, implementing a listen before transmit access mechanism, the equipment comprising:
  a receiver able to receive, in the shared frequency band, an identity of a sharing group, channel sharing information and a transmission duration, transmitted by a second cell of the cellular access network,
  a transmitter able to transmit data in the shared frequency band,
  a processor for:
    driving the transmitter and the receiver and implementing an adapted listen before transmit access mechanism such that the processor determines an interfering power separately from a received power associated with a transmission of the second cell,
    authorizing channel sharing with the second cell on the condition at least that the first cell belongs to the same sharing group, that the channel sharing information authorizes this sharing and that the interfering power does not exceed a given threshold.

According to one particular embodiment of the invention, the interfering power is determined as being the total received power minus the received power associated with a transmission of the first cell.

According to one particular embodiment of the invention, a determined time-frequency resource excluded from time-frequency resources dedicated to a transmission of the first cell is used to determine the received power associated with a transmission of the first cell.

According to this embodiment, the power received on the determined time-frequency resource corresponds to pure interference that makes it possible to evaluate the received power associated with a transmission of the first cell.

According to one particular embodiment of the invention, a data transmission by the second cell shares the channel with the first cell and ends, at the latest, at the end of the transmission duration of the first cell.

This embodiment ensures an absence of interference for any other equipment when it accesses the same channel.

According to one particular embodiment of the invention, the second cell that shares the channel with the first cell transmits an adapted transmission duration that ends when the transmission duration of the first cell ends, transmits an identity of a second sharing group and second channel sharing information.

This embodiment ensures that, if a third cell shares the channel with the second cell, then this sharing may end, at the latest, with the end of the transmission of the first cell. This ensures fair coexistence with other cells or Wi-Fi nodes in the same channel.

According to one particular embodiment of the invention, the second sharing group is different from the first sharing group.

According to one particular embodiment of the invention, an identity of a sharing group, channel sharing information and a transmission duration form part of physical layer signaling.

According to one particular embodiment of the invention, the identity of a sharing group, the channel sharing information and the transmission duration form part of a signaling field that precedes a transmitted data field, this signaling field allowing the transmission to be adapted to constraints of an unlicensed band.

According to this embodiment, the physical layer signaling is carried by a SIG field. Given that this field is always positioned at the start of the transmission duration, it is able to be read quickly. The channel sharing mechanism may thus be activated quickly.

According to one particular embodiment of the invention, an identity of a sharing group, channel sharing information and a transmission duration form part of RRC layer signaling.

According to this embodiment, the information may be carried by a conventional signaling channel such as the PDSCH channel of a 3GPP standard; no new signaling channel is necessary in this embodiment.

According to one particular embodiment of the invention, the identity of a sharing group, the channel sharing information and the transmission duration form part of a transmitted data field.

This embodiment has the advantage of not requiring resources to be reserved in a preamble.

According to one particular embodiment of the invention, the identity of a sharing group comprises at least one identity of an operator of the first cell and of the second cell, an identity of the node associated with the first cell, an identity of the first cell, an identity of the node associated with the second cell, an identity of the second cell.

LIST OF THE FIGURES

Figure 4:
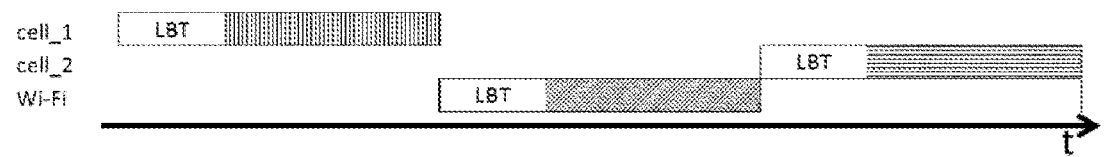
Figure 5:
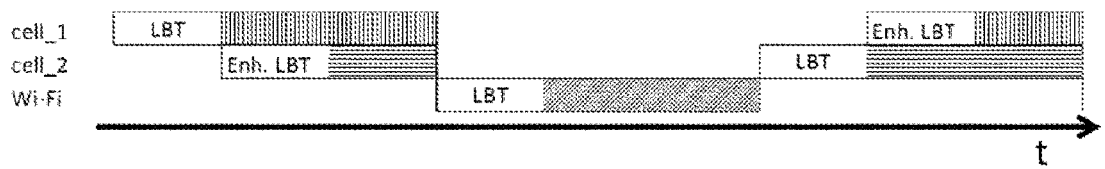
Figure 6:
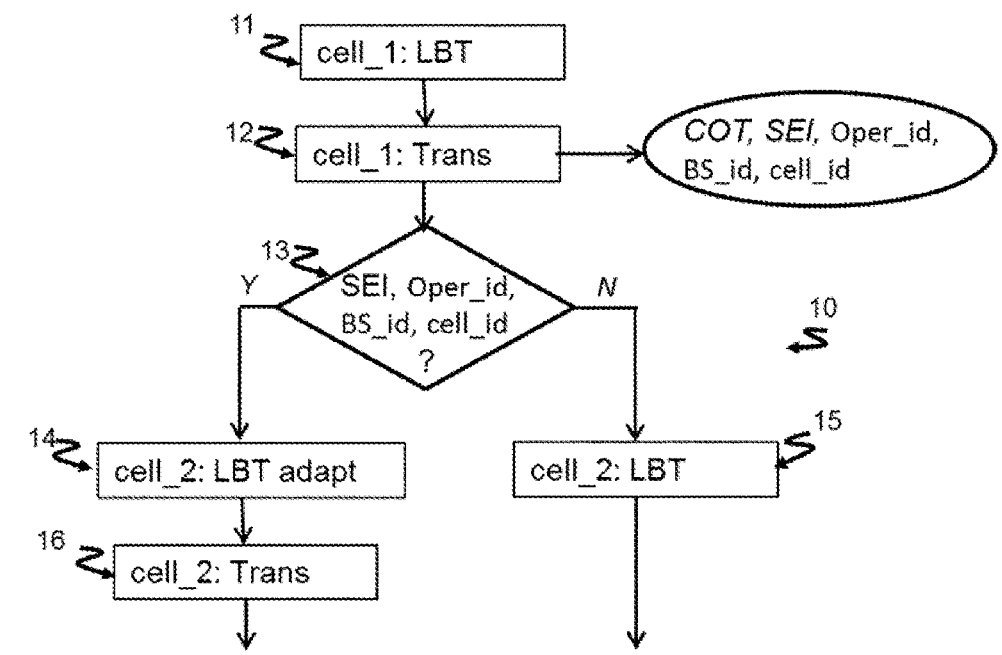
Figure 7:
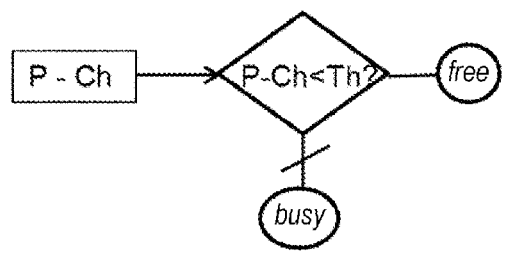
Figure 8:
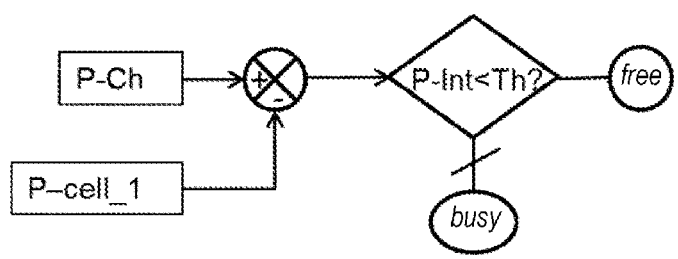
Figure 14:
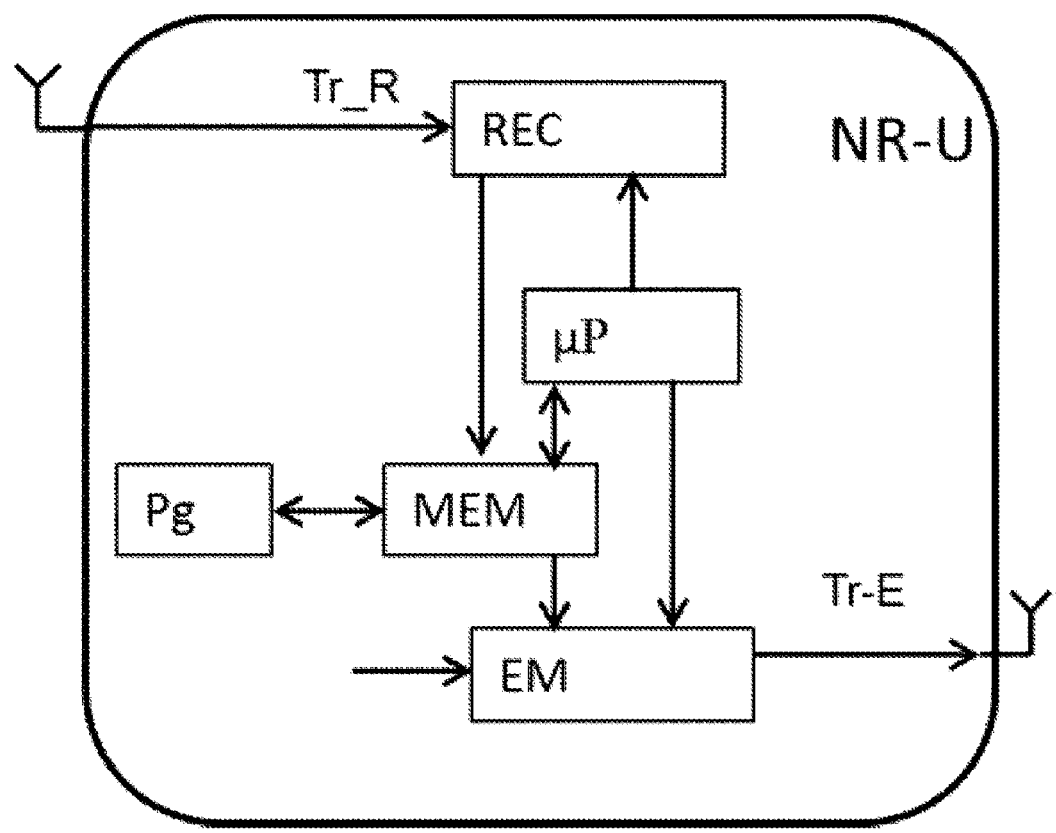

Other features and advantages of the invention will become more clearly apparent upon reading the following description of particular embodiments, provided by way of simple illustrative and non-limiting examples, and the appended drawings, in which:

FIG. 1 is a diagram illustrating the countdown of waiting counters of three equipments that share one and the same channel and implement the LBT cat4 mode in which the contention window has a variable size, FIG. 2 is a diagram of an NR (5G) access network with two nodes, a master node and a secondary node, illustrating a scenario of dual connectivity of a terminal to the master node and to the secondary node, FIG. 3 is a diagram of an NR (5G) access network with two nodes respectively carrying two cells that each serve one or more user equipments, illustrating a multiple connectivity scenario, FIG. 4 is a diagram of a channel accessed by a Wi-Fi equipment and two cells, illustrating the time offset in terms of accessing the channel given the LBT mechanism, FIG. 5 is a diagram of a channel accessed by a Wi-Fi equipment and two cells, illustrating the channel sharing given the adapted LBT mechanism according to the invention, FIG. 6 is a flowchart of a transmission method according to the invention, FIG. 7 is a diagram illustrating the LBT mechanism, FIG. 8 is a diagram illustrating the adapted LBT mechanism according to the invention, FIG. 9 is a diagram of the time-frequency distribution of the CSI-IM resources dedicated to the interference measurement, FIG. 10 is table 1, FIG. 11 is table 2, FIG. 12 is table 3, FIG. 13 is table 4, FIG. 14 is a diagram of a simplified structure of an NR-U equipment according to the invention, able to implement a transmission method according to the invention.

DESCRIPTION OF ONE EMBODIMENT OF THE INVENTION

The general principle of the invention is based on channel sharing between equipments in a sharing group during the transmission of one of these equipments, called sharing equipment, if the interfering power of the equipment in the group wishing to benefit from the sharing is lower than a threshold, even if the total power received by this equipment exceeds the threshold.

During the transmission of the sharing equipment, this authorizes or does not authorize channel sharing with one or more equipments in the same sharing group.

The equipments authorized to share the channel are therefore authorized to transmit during the transmission of the sharing equipment, whereas, with a conventional channel access mechanism, these equipments are not able to access the already busy channel.

When an equipment benefits from channel sharing, its transmission imperatively has to end, at the latest, at the same time as that of the sharing equipment, even if its transmission starts after that of the sharing equipment.

An equipment that benefits from channel sharing may itself authorize channel sharing for one or more equipments in another sharing group. If an equipment benefits from sharing, its transmission imperatively has to end, at the latest, at the same time as that of the initial sharing equipment, even if its transmission starts after that of the sharing equipment.

EXEMPLARY IMPLEMENTATIONS

According to one embodiment, the channel belongs to the unlicensed band from the NR (5G) specifications of the 3GPP, which is shared with a Wi-Fi band, called NR-U.

To access this channel, an equipment, whether it is compatible with an NR-U radio access network and/or compatible with a Wi-Fi standard, has to implement a conventional LBT listen before transmit channel access mechanism.

An NR-U equipment according to the invention is compatible with an NR (5G) radio access network and is able to operate in an unlicensed band shared with Wi-Fi. This NR-U equipment is able to implement a transmission method according to the invention.

The NR-U equipment may be either a base station or a mobile terminal. The base station may serve (have) one or more cells.

FIG. 5 picks up from the example of FIG. 4, in which two cells cell_1, cell_2 and a Wi-Fi equipment are in competition to access the channel in order to transmit data.

According to the invention, if one of the cells, cell_1, gains access to the channel, it may share the channel with the other cell, cell_2, thereby giving an additional opportunity for this other cell to access the channel. Sharing may possibly take place with more than one other cell, thus leading to multiple opportunities to access the channel that did not exist using the conventional LBT access mechanism.

Sharing thus leads to a reduction in the latency time for the other cell cell_2 and for any other cell benefiting from the sharing. The sharing furthermore leads to an increase in spectral efficiency, since one and the same band is used simultaneously by the two cells cell_1 and cell_2 to transmit data. According to the invention, the two cells cell_1 and cell_2 may thus in particular simultaneously serve two different users who are each only within the coverage of just one of the two cells, even though each of the two cells are within the coverage of one another.

The temporal overlap of multiple transmissions, that of the cell cell_1 with that of the cell cell_2, means that the invention may allow multi-node connectivity when the two cells serve one and the same user. Multiple connectivity may take place on one and the same band with the transmission of the same data by the two cells in a manner similar to a CoMP (Cooperative Multi-Point) mechanism specified in the LTE standard of the 3GPP.

The sequence of a method according to the invention is illustrated in FIGS. 5 and 6.

In the method 10, the cell cell_1 implements 11 the LBT, listen before transmit, channel access mechanism.

Thus, in a known manner illustrated in FIG. 7, the cell cell_1 performs a measurement of the total power P-Ch received in the channel. Such a measurement is in particular specified for Wi-Fi in the IEEE 802.11-2016 standard, chapter 17.3.10.6 "CCA requirements". According to this specification, the power of the detected signal is averaged over the band that is used over at least 4 µs. If this total power is greater than a determined threshold Th (for example specified in the standard), then the cell cell_1 deduces therefrom that the channel is considered to be busy busy. If the total power P-Ch is lower than the same threshold Th, then the channel is considered to be free free. If the channel is considered to be free, the cell cell_1 gains access to the channel at the end of a fixed duration followed by the countdown of the backoff counter.

Having gained access to the channel, the cell cell_1 performs 12 a data transmission Trans, including sharing data according to the invention.

These sharing data comprise the identity of a cell sharing group as well as channel sharing information (SEI: Sharing Enabled Information). A cell sharing group is identified by identification data that comprise an identity Oper_id of an operator of the cells in the group, an identity BS_id of the node associated with each cell in the group, and an identity cell_id of each cell in the group. The channel sharing information authorizes or does not authorize channel sharing with equipments/cells in the sharing group identified during the transmission.

The transmission of the cell cell_1 comprises a field giving the duration of its transmission COT.

The cell cell_2 detects and tests 13 the sharing data. If the cell cell_2 belongs to the same sharing group as the cell cell_1 and if the channel sharing information transmitted by the cell cell_1 allows it to share, then the cell cell_2 may benefit from channel sharing.

If the channel sharing data test 13 is positive Y, the cell cell_2 implements 14 the adapted LBT mechanism Enh_LBT in the event of data to be transmitted. The adaptation according to the invention is such that the cell cell_2 may consider the channel to be free free even if another cell is already occupying the channel.

If the channel sharing data test 13 is negative N, the cell cell_2 implements 15 the conventional LBT mechanism in the event of data to be transmitted.

According to one embodiment of the adaptation of the LBT mechanism illustrated in FIG. 8, the cell cell_2 separately evaluates the received power P-cell_1, associated with a transmission of the cell cell_1, from a total received power P-Ch.

If the total received power P-Ch minus the received power P-cell_1 associated with the transmission of the cell cell_1, called remaining or interfering power P-Int, does not exceed the threshold Th, then the channel is considered to be free free.

If the interfering power P-Int exceeds the threshold Th, then the channel is considered to be busy busy.

According to this embodiment, the total received power may be measured during the CCA (Clear Channel Assessment) mechanism of the LBT mechanism of Wi-Fi, in a similar manner to an LTE LAA cat4 mode. The cell cell_2 subtracts the received power P-cell_1 of the sharing cell cell_1 from the total average power Pcca_conventional in order to determine the interference power P-Int. The status of the channel is then determined by comparing the interference power P-Int with the threshold Th.

According to one embodiment of the adaptation of the LBT mechanism, the cell cell_2 determines a received interference level Interf_csi-im in order to determine the received power P-cell_1. This interference level Interf_csi-im is determined from time-frequency resources dedicated to the interference measurement, CSI-IM (Channel State Information-Interference Measurement) with reference to the technical specification TS 36.213 v13.0.0 (March 2016) of the 3GPP. These time-frequency resources, illustrated in FIG. 9, where they are represented by a dark color, are excluded from the data transmission. Therefore, the estimated power Interf_csi-im estimated based on these CSI-IM resources corresponds to a pure interference (and noise) level. In parallel, the cell cell_2 determines the total power received on determined time-frequency resources. With reference to FIG. 9, these determined time-frequency resources are for example those that occupy the entire band and are limited to the same temporal duration as the CSI-IM resources. Given that the received power P-cell_1 is relatively constant over the duration COT, this received power P-cell_1 may be determined by subtracting the power Interf_csi-im from this total power received on these determined time-frequency resources.

When the cell cell_2 considers the channel to be free free at the end of the adapted LBT mechanism, then it performs 16 a transmission Trans while sharing the channel with the cell cell_1. The transmission of the cell cell_2 has to end, at the latest, when the transmission duration COT of the cell cell_1 expires. This constraint guarantees fair coexistence with other cells or Wi-Fi nodes.

According to one embodiment, the identity of a sharing group (also referred to as an identifier that comprises Oper_id, BS_id, cell_id), the channel sharing information SEI and the transmission duration COT form part of a SIG (Signal) signaling field that precedes a transmitted data field in the transmission of the cell cell_1. The SIG field is conventionally positioned at the start of the transmission duration. This signaling field allows the transmission to be adapted to constraints of an unlicensed band.

According to one embodiment, the identity of a sharing group, the channel sharing information SEI and the transmission duration COT form part of higher-layer signaling, such as RRC (Radio Resource Control) layer signaling. This signaling comprises for example a table of specially formatted identity data.

Table 1, shown in FIG. 10, is one example of identification of three different sharing groups that each depend on a sharing cell. The identified groups are such that at most two cells or nodes of a group may share the channel with a sharing cell.

Table 1 furthermore gives the order of the beneficiary cells. For example, for the first group associated with the node BS_1 and with the cell cell_1, the cell cell_2 of the same node has priority over the cell cell_3 of the same node for benefiting from channel sharing with the cell cell_1.

A channel sharing information table may be added to the identification table. This sharing information table indicates which cells or cells in a group are actually authorized, or indicates whether sharing is not authorized. Table 2, shown in FIG. 11, is one example of such a sharing authorization table.

With such a channel sharing information table, the sharing cell is able to modify the number of beneficiary cells for a transmission, even though the constitution of the sharing group is known to each cell in the group and does not change.

A beneficiary cell that accesses the channel while implementing an adapted LBT access mechanism according to the invention transmits, in addition to the data, information that comprises the identity of a sharing group, channel sharing information and a transmission duration. This transmission duration ends, at the latest, at the same time as the transmission duration from which this beneficiary cell benefits.

If this beneficiary cell cannot itself be a sharing cell, then it duplicates the identity data and the channel sharing information transmitted by its sharing cell.

If this beneficiary cell is itself able to be a sharing cell when it transmits, then it updates the identity data of a sharing group and the signaling information that comprises channel sharing information.

Based on table 1 shown in FIG. 10, the cell BS_1/cell_2 may be a beneficiary and it may itself be a sharing cell.

According to one example, the cell BS_1/cell_2 receives, from the cell BS_1/cell_1, identity data of a sharing group given by table 3 shown in FIG. 12, and the sharing cell BS_1/cell_1 authorizes it to share the channel.

The cell BS_1/cell_2 is the beneficiary of the transmission of the sharing cell BS_1/cell_1, and it may itself share its access to the channel. The identity data of a sharing group that it transmits are thus those in table 4 shown in FIG. 13.

The cell BS_1/cell_2 transmits channel sharing information, which may be in the form of a sharing information table. This table may for example be identical to table 2.

Although the steps have been shown and described in succession, some steps may take place in parallel.

The simplified structure of an NR-U equipment according to the invention conforming to an NR protocol of a cellular access network and able to transmit in a frequency band shared with a network conforming to a second protocol, for example Wi-Fi, is illustrated in FIG. 14. The NR-U equipment comprises at least one cell cell_2 of the cellular access network.

The NR-U equipment comprises a transmitter EM, a receiver REC, and a memory MEM comprising a buffer memory. The NR-U equipment furthermore comprises a processor μP, the operation of which is controlled by executing a program Pg, the instructions of which make it possible to implement a data transmission method according to the invention as described above.

The transmitter EM is able to transmit data that are generally inserted into a frame Tr_E in the shared frequency band by implementing a listen before transmit LBT access mechanism in which the receiver REC participates.

The receiver REC is able to receive data that are generally inserted into a frame Tr_R in the shared frequency band and that are transmitted by another cell of the cellular network. The receiver REC is able, in the shared frequency band, to receive an identity of a sharing group, channel sharing information SEI and a transmission duration COT, transmitted by the other cell of the cellular access network.

On initialization, the code instructions of the program Pg are for example loaded into the buffer memory MEM before being executed by the processor μP.

Depending on the sequence of these instructions, the processor μP drives the transmitter EM and the receiver REC so as to implement an adapted listen before transmit LBT access mechanism Enh_LBT such that the processor μP determines an interfering power separately from a received power associated with a transmission of the other cell.

Depending on the sequence of these instructions, the processor μP authorizes channel sharing with the other cell on the condition at least that the cell belongs to the sharing group, that the channel sharing information authorizes this sharing and that the interfering power does not exceed a given threshold.

As a result, the invention also applies to one or more computer programs, in particular a computer program on or in an information medium, adapted to implement the invention. This program may use any programming language and be in the form of source code, object code or intermediate code between source code and object code, such as in a partially compiled form, or in any other desirable form for implementing a method according to the invention.

The information medium may be any entity or device capable of storing the program. For example, the medium may include a storage means, such as a ROM, for example a CD-ROM or a microelectronic circuit ROM, or else a magnetic recording means, for example a floppy disk or a hard disk.

Moreover, the information medium may be a transmissible medium such as an electrical or optical signal, which may be routed via an electrical or optical cable, by radio or by other means. The program according to the invention may in particular be downloaded from an Internet network.

As an alternative, the information medium may be an integrated circuit into which the program is incorporated, the circuit being designed to execute or to be used in the execution of the method in question.

The invention claimed is:

1. A data transmission method implemented by an equipment having a cell, called a second cell, conforming to a first protocol of a cellular access network, able to transmit in a frequency band shared with a network conforming to a second protocol and able to implement a listen before transmit access mechanism, wherein the method comprises:

using the listen before transmit access mechanism by another cell, called a first cell, and transmitting, by this first cell, an identity of a first sharing group, first channel sharing information and a transmission duration, authorizing channel sharing with the first cell on a condition at least that the second cell belongs to the same first sharing group and that the first channel sharing information authorizes this sharing, using an adapted listen before transmit access mechanism by the second cell, such that the second cell determines an interfering power, which interferes with a transmission of the first cell, transmitting data by the second cell by sharing the channel with the first cell on a condition that the interfering power does not exceed a given threshold, and ending this transmission of data by the second cell, at the latest, at an end of the transmission duration of the first cell.

2. The data transmission method as claimed in claim 1, wherein the interfering power is determined as being a total received power minus a received power associated with a transmission of the first cell.

3. The data transmission method as claimed in claim 2, wherein a determined time-frequency resource excluded from time-frequency resources dedicated to a transmission of the first cell is used to determine the received power associated with a transmission of the first cell.

4. The data transmission method as claimed in claim 3, wherein:
the second cell that shares the channel with the first cell transmits an adapted transmission duration that ends when the transmission duration of the first cell ends, and transmits an identity of a second sharing group and second channel sharing information.

5. The data transmission method as claimed in claim 4, wherein the second sharing group is different from the first sharing group.

6. The data transmission method as claimed in claim 1, wherein the identity of the first sharing group, the first channel sharing information and the transmission duration form part of physical layer signaling.

7. The data transmission method as claimed in claim 6, wherein the identity of the first sharing group, the first channel sharing information and the transmission duration form part of a signaling field that precedes a transmitted data field, this signaling field allowing the transmission to be adapted to constraints of an unlicensed band.

8. The data transmission method as claimed in claim 1, wherein the identity of the first sharing group, the first channel sharing information and the transmission duration form part of Radio Resource Control (RRC) layer signaling.

9. The data transmission method as claimed in claim 8, wherein the identity of the first sharing group, the first channel sharing information and the transmission duration form part of a transmitted data field.

10. The data transmission method as claimed in claim 1, wherein:
the identity of the first sharing group comprises at least one identity of an operator of the first cell and of the second cell, an identity of a node associated with the first cell, an identity of the first cell, an identity of a node associated with the second cell, and an identity of the second cell.

11. An equipment comprising:
a first cell, conforming to a first protocol of a cellular access network and able to transmit in a frequency band shared with a network conforming to a second protocol, implementing a listen before transmit access mechanism, the equipment comprising:
a receiver able to receive, in the shared frequency band, an identity of a sharing group, channel sharing information and a transmission duration, transmitted by a second cell of the cellular access network,
a transmitter able to transmit data in the shared frequency band, and
a processor configured to:
drive the transmitter and the receiver and implement an adapted listen before transmit access mechanism such that the processor determines an interfering power, interfering with a transmission of the second cell,
authorize channel sharing with the second cell on a condition at least that the first cell belongs to the same sharing group and that the channel sharing information authorizes this sharing, and
drive the transmitter to transmit data with channel sharing with the second cell on a condition that the interfering power does not exceed a given threshold, this transmission of data ending, at the latest, at the end of the transmission duration of the second cell.

12. A non-transitory computer-readable medium comprising program instructions stored thereon which are adapted to implement a data transmission method when said instructions are loaded and executed in a base station, wherein the base station includes a cell, called a second cell, conforming to a first protocol of a cellular access network, able to transmit in a frequency band shared with a network conforming to a second protocol and able to implement a listen before transmit access mechanism, wherein the instructions configure the base station to:
use the listen before transmit access mechanism by another cell, called a first cell, and transmit, by this first cell, an identity of a first sharing group, first channel sharing information and a transmission duration,
authorize channel sharing with the first cell on a condition at least that the second cell belongs to the same first sharing group and that the first channel sharing information authorizes this sharing,
use an adapted listen before transmit access mechanism by the second cell such that the second cell determines an interfering power, which interferes with a transmission of the first cell,
transmit data by the second cell by sharing the channel with the first cell on a condition that the interfering power does not exceed a given threshold, and ending this transmission of data by the second cell, at the latest, at an end of the transmission duration of the first cell.

* * * * *